United States Patent
Zhou et al.

(10) Patent No.: US 10,657,669 B2
(45) Date of Patent: May 19, 2020

(54) DETERMINATION OF A GEOGRAPHICAL LOCATION OF A USER

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Shuchang Zhou, Beijing (CN); Xinyu Zhou, Beijing (CN); Yuxin Wu, Beijing (CN); Jianan Wu, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/888,629

(22) PCT Filed: Mar. 25, 2015

(86) PCT No.: PCT/CN2015/075041
§ 371 (c)(1),
(2) Date: Aug. 31, 2016

(87) PCT Pub. No.: WO2016/149918
PCT Pub. Date: Sep. 29, 2016

(65) Prior Publication Data
US 2016/0371840 A1  Dec. 22, 2016

(51) Int. Cl.
*G06T 7/73* (2017.01)
*H04W 4/33* (2018.01)
(Continued)

(52) U.S. Cl.
CPC ........... *G06T 7/73* (2017.01); *G06K 9/00664* (2013.01); *G06K 9/3258* (2013.01); *H04W 4/029* (2018.02);
(Continued)

(58) Field of Classification Search
CPC ..... G06F 16/58; G06F 3/0481; H04N 1/2179; H04N 1/2187
See application file for complete search history.

(56) References Cited

U.S. PATENT DOCUMENTS 5,721,938 A     2/1998  Stuckey
7,309,009 B2 *  12/2007 Singer-Harter ........ G06Q 30/02
                                                235/375
(Continued)

FOREIGN PATENT DOCUMENTS

CN    101496049    7/2009
CN    101620680    1/2010
(Continued)

OTHER PUBLICATIONS

International Search Report and Written Opinion issued in the corresponding International application No. PCT/CN20151075041, dated Jan. 4, 2016, 18 pages.
(Continued)

*Primary Examiner* — Yosef Kassa
(74) *Attorney, Agent, or Firm* — Hamre, Schumann, Mueller & Larson, P.C.

(57) ABSTRACT

A method, a device and a computer program product for determining a geographical location of a user are disclosed. The method comprises: extracting characters or icons in an image taken at a place where the user is located; analyzing the extracted characters or icons to determine a meaning of the characters or the icons; and determining the geographical location of the user based on the meaning of the characters
(Continued)

or the icons. With the method, the device and the computer program product, the geographical location of the user may be accurately determined in various scenarios.

13 Claims, 3 Drawing Sheets

(51) Int. Cl.
*H04W 4/029* (2018.01)
*G06K 9/00* (2006.01)
*G06K 9/32* (2006.01)

(52) U.S. Cl.
CPC ......... *H04W 4/33* (2018.02); *G06K 2209/011* (2013.01)

(56) References Cited

U.S. PATENT DOCUMENTS

| | | | |
|---|---|---|---|
| 7,765,231 B2 * | 7/2010 | Rathus | G06F 21/60 707/783 |
| 7,793,205 B2 * | 9/2010 | Errico | H04N 21/23614 715/201 |
| 8,600,800 B2 * | 12/2013 | Rowe | G06Q 30/02 705/13 |
| 9,094,615 B2 * | 7/2015 | Aman | H04N 5/262 |
| 2008/0086356 A1 | 4/2008 | Glassman et al. | |
| 2012/0208565 A1 | 8/2012 | Mani et al. | |
| 2012/0310968 A1 * | 12/2012 | Tseng | G06F 16/5866 707/769 |
| 2012/0330646 A1 * | 12/2012 | Andrade | G06F 17/289 704/7 |
| 2016/0027042 A1 * | 1/2016 | Heeter | G06Q 30/0248 705/14.47 |

FOREIGN PATENT DOCUMENTS

| | | |
|---|---|---|
| CN | 101945327 | 1/2011 |
| CN | 102915310 | 2/2013 |
| CN | 103424113 | 12/2013 |
| CN | 103874193 | 6/2014 |
| CN | 104112124 | 10/2014 |

OTHER PUBLICATIONS

First Office Action, issued in the corresponding Chinese patent application No. 201580000317.8, dated May 3, 2018, 19 pages.
Second Office Action, issued in the corresponding Chinese patent application No. 201580000317.8, dated Dec. 7, 2018, 17 pages.
Third Office Action, issued in the corresponding Chinese patent application No. 201580000317.8, dated May 22, 2019, 17 pages.

* cited by examiner

DETERMINATION OF A GEOGRAPHICAL LOCATION OF A USER

TECHNICAL FIELD

The present disclosure relates to a positioning technology, and more specifically, to a method, a device and a computer program product for determining a geographical location of a user.

BACKGROUND

To perform navigation or provide other location based services (LBS), it is necessary to accurately determine a geographical location of a user. In recent years, many methods for determining the geographical location of the user, such as a global positioning system (GPS) positioning method and a WIFI positioning method, have been proposed. In the GPS positioning method, geographical coordinates of a portable device carried by the user are calculated and determined based on a GPS signal which is received by the portable device, so as to determine the geographical location of the user. However, the GPS positioning method is limited by a capability of receiving the GPS signal by the portable device. For example, when the portable device is located indoors, underground and at a location between buildings, it is hard for this portable device to receive a high-quality GPS signal, leading to decreased positioning accuracy or even a failure of positioning. In the WIFI positioning method, a mapping relationship between service set identifier (SSID) lists of WIFI devices provided in respective geographical locations and the respective geographical locations is stored in a database in advance. Then, at the time of positioning, a SSID list of WIFI devices at a place where the user is located is sensed, and the list is matched with the SSID lists stored in the database in advance, so as to determine the geographical location of the user according to the geographical location to which a matching SSID list is mapped. However, in the WIFI positioning method, it is required to collect the SSID lists of the respective geographical locations in advance on site, which leads to a high cost, and if the WIFI devices in some geographical location changes, the SSID list stored in the database will be outdated, causing decreased positioning accuracy and even a failure of positioning.

SUMMARY OF THE INVENTION

According to an aspect of the present disclosure, a method for determining a geographical location of a user is provided. The method comprises: extracting characters or icons in an image taken at a place where the user is located; analyzing the extracted characters or icons to determine a meaning of the characters or the icons; and determining the geographical location of the user based on the meaning of the characters or the icons.

According to another aspect of the present disclosure, a device for determining a geographical location of a user is provided. The device comprises a processor, a memory and computer program instructions stored in the memory. The computer program instructions, when executed by the processor, perform steps of extracting characters or icons in an image taken at a place where the user is located; analyzing the extracted characters or icons to determine a meaning of the characters or the icons; and determining the geographical location of the user based on the meaning of the characters or the icons.

According to still another aspect of the present disclosure, a computer program product for determining a geographical location of a user is provided. The computer program product comprises a computer readable storage medium in which computer program instructions are stored, and the computer program instruction may be executed by the processor to cause the processor to extract characters or icons in an image taken at a place where the user is located; analyze the extracted characters or icons to determine a meaning of the characters or the icons; and determine the geographical location of the user based on the meaning of the characters or the icons.

According to yet another aspect of the disclosure, a device for determining a geographical location of a user is provided. The device comprises an extracting apparatus, configured to extract characters or icons in an image taken at a place where the user is located; an analysis apparatus, configured to analyze the extracted characters or icons to determine a meaning of the characters or the icons; and a positioning apparatus, configured to determine the geographical location of the user based on the meaning of the characters or the icons.

With the method, the device and the computer program product according to the above aspects of the present disclosure, the geographical location of the user may be accurately determined in various scenarios, especially in a scenario where the geographical location of the user may not be accurately determined by using a conventional positioning method.

BRIEF DESCRIPTION OF THE DRAWINGS

The above and other objectives, features and advantages of the present disclosure will become more apparent from a detailed description of exemplary embodiments of the present disclosure in conjunction with the drawings, in which like reference signs usually indicate like components.

DESCRIPTION OF THE EMBODIMENTS

Firstly, a block diagram of an exemplary portable device that can be used for realizing an embodiment of the disclosure is described with reference to FIG. 1. The portable device may be carried by a user, and may be, for example, a mobile phone, a personal digital assistant (PDA), a tablet computer, a notebook computer or the like, and the mobile phone may be, for example, a smart phone or the like.

Figure 1:
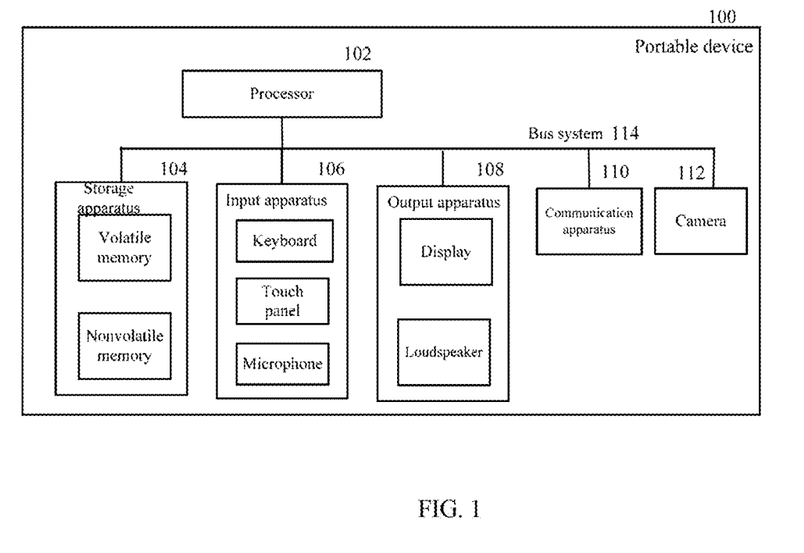
FIG. 1 shows a block diagram of an exemplary portable device that can be used for realizing an embodiment of the present disclosure.

As shown in FIG. 1, the portable device 100 comprises one or more processors 102, a storage apparatus 104, an input apparatus 106, an output apparatus 108, a communication apparatus 110 and a camera 112, and these components are interconnected through a bus system 114 and/or a connecting mechanism (not shown) in other form. It should be noted that, the components and the structure of the portable device 100 shown in FIG. 1 are only illustrative rather than limitative, and the portable device 100 may have other components and structure as required.

The processor 102 may be a central processing unit (CPU) or a processing unit in any other form having a data processing capacity and/or an instruction executing capacity, and may control other components in the portable device 100 to execute desired functions.

The storage apparatus 104 may comprise one or more computer program products, the computer program product may comprise computer readable storage mediums in various forms, for example, a volatile memory and/or a nonvolatile memory. The volatile memory may, for example, comprise a random access memory (RAM) and/or a cache and the like. The nonvolatile memory may, for example, comprise a read-only memory (ROM), a hard disk, a flash disk and so on. One or more computer program instructions may be stored on the computer readable storage mediums, and the processor 104 may execute the program instructions to realize a function of the embodiment of the present disclosure described below and/or other desired functions. Various application programs, and various data such as map data, image data, various data used and/or generated by the application programs and the like may be stored in the computer readable storage mediums.

The input apparatus 106 may be an apparatus for the user to input an instruction, and may comprise one or more of a keyboard, a mouse, a microphone, a touch panel and the like. The instruction is, for example, an instruction of taking an image by using the camera 112 as described below. The output apparatus 108 may output various information (for example, images or sounds) to outside (for example, the user), and may comprise one or more of a display, a loudspeaker and the like. The communication apparatus 110 may communicate with other apparatus (for example, a personal computer, a server, a mobile station, a base station, etc.) through a network or by other technologies, in which the network may be Internet, a wireless local area network, a mobile communication network or the like, and the other technologies may comprise, for example, Bluetooth communication, infrared communication or the like. The camera 112 may take an image (for example, a photo, a video, etc.) desired by the user, and store the image taken in the storage apparatus 104 for use by other components.

The user may carry the portable device to various places, such as an office building, a store, a residential building, a street or the like, therefore the geographical location of the user may be determined by determining a geographical location of the portable device. The store may be an independent store, or may be a store inside a building (for example, a shopping center).

Next, a method for determining the geographical location of the user according to an embodiment of the invention will be described with reference to FIG. 2. The method may be executed by the portable device or other devices.

Figure 2:
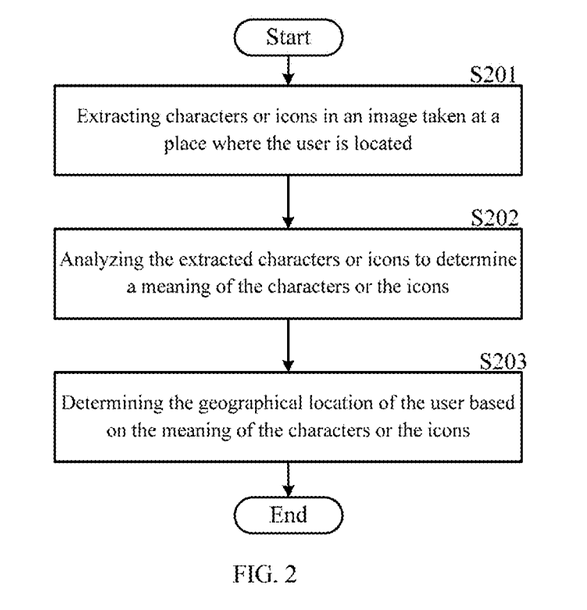
FIG. 2 shows a flow diagram of a method for determining a geographical location of a user according to an embodiment of the present disclosure.

As shown in FIG. 2, in step S201, characters or icons in an image taken at a place where the user is located may be extracted.

Figure 3:
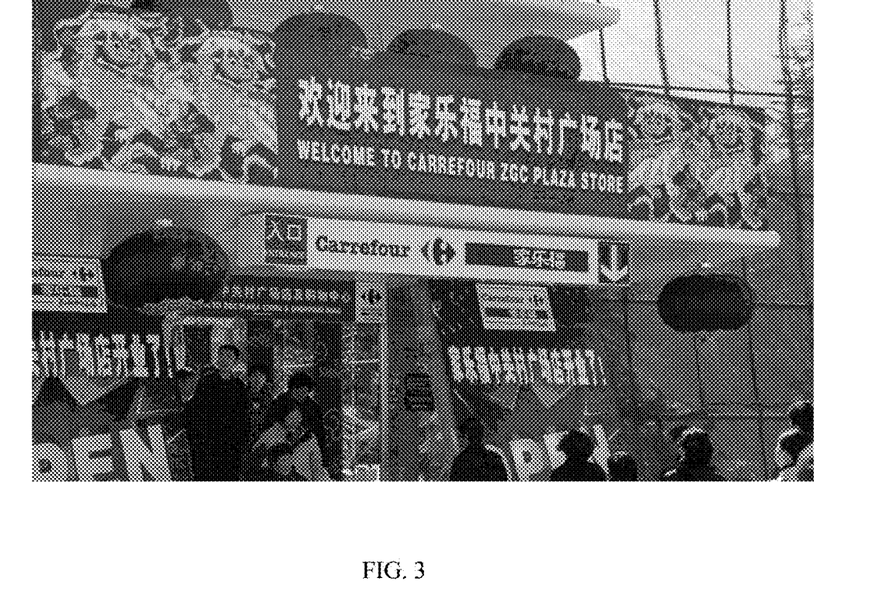
FIG. 3 shows an example of an image taken at a place where the user is located.
Figure 4:
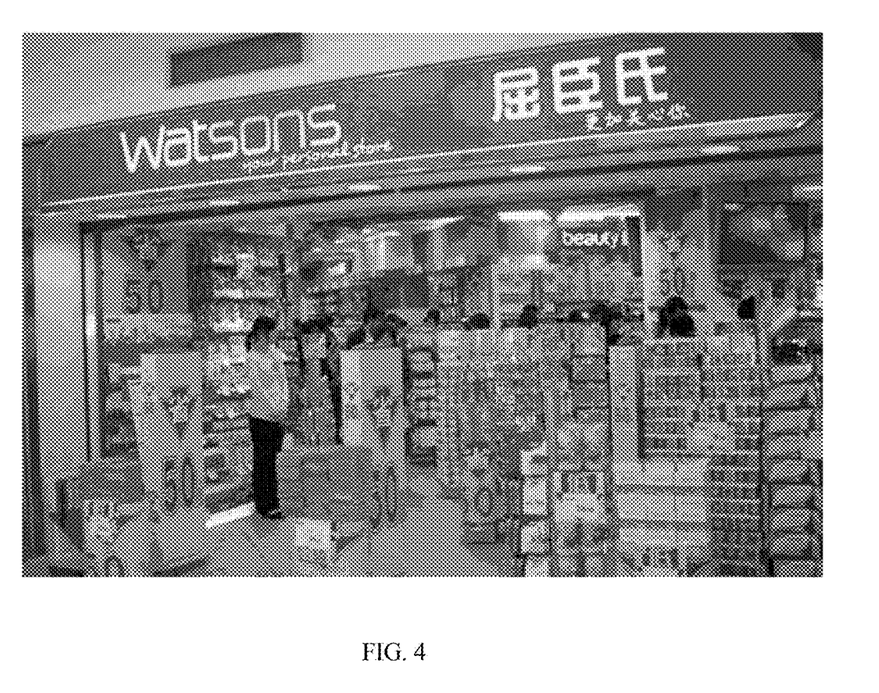
FIG. 4 shows another example of an image taken at a place where the user is located.

Specifically, the image may be taken at the place where the user is located by using the portable device or another shooting device (for example, a camera capable of transmitting the image to outside). The image may be a photo or a video, and the photo may comprise one or more photos for a single scenario, or may be a panoramic photo. The image taken may reflect an environment where the user is located, for example, a building (an office building or a residential building) around the user, a store around the user, a street where the user is located, and the like. Accordingly, the image may comprise a character(s) and/or an icon(s), which may be an identification of the building such as the office building or the residential building, the store or the street, or may be a character(s) or an icon(s) of other types, such as an advertisement, a road sign, promotion information and the like. FIG. 3 shows an example of an image taken at a place where a user is located. In this example, the image is a photo, the user is located near an entrance of a Carrefour® supermarket, and this photo includes characters "家乐福" and "Carrefour" as well as an icon "", which serve as an identification of the Carrefour® supermarket, and further includes other characters, for example, indication characters "入口" and so on. FIG. 4 shows another example of a photo taken at a place where the user is located. In this example, the image is a photo, the user is located near a Watsons® store, and the photo includes characters "屈臣氏" and "Watson" which serve as an identification of Watsons® and further includes other characters, for example, an advertisement statement "更加关心你" and the like.

After the image taken is obtained, the characters and the icons in the image may be extracted. In this embodiment, all characters or icons in the image may be recognized, and all the recognized characters or icons, or a character(s) or an icon(s) with confidence greater than a threshold in all the recognized characters or icons are extracted. Optionally, before the characters or the icons in the image are recognized, the image may be preprocessed so as to facilitate the recognition. For example, in a case where the image is a photo, the preprocessing may comprise zooming the photo, and in a case where the image is a video, the preprocessing may comprise extracting a key frame of the video.

Specifically, the characters in the image may be recognized by using an optical character recognition (OCR) method. In this method, the image may be scanned to detect positions of all character boxes possibly including characters in the image, then content in each character box may be recognized as characters, and a recognition result is output. The detection and the recognition may be implemented, for example, by a neutral network classifier well known in the art. The recognition result may comprise the recognized characters, and positions of the characters which may be represented, for example, by coordinates of the characters in a two-dimensional coordinate system established in the image. The recognition result may further comprise confidence of the recognized characters. Specifically, when the characters are recognized from the image by using the OCR method, the confidence of the recognized characters may change according to factors such as a definition of the image as well as complexities, sizes, positions and shapes of the characters, so that the confidence of some characters is higher, for example, 80% or 100%, and the confidence of some characters are lower, for example, 20% or 5%. When the characters are recognized by using the OCR method, the confidence of the recognized characters may be determined simultaneously, and are included in the recognition result. In this way, accuracy of the recognized characters may be determined through the confidence. Because a specific method for recognizing the characters in the image by adopting the OCR method is well known in the art, a detailed description thereof is omitted herein for the sake of brevity. After the characters in the image are recognized, all the recognized characters or the characters with confidence greater than a threshold in the recognized characters may be extracted for use by subsequent operations. The threshold may be a numerical value preset as required, for example, 50% or 70%. Compared with extracting all the recognized characters, extracting the characters with confidence greater than the threshold in the recognized characters may enable to use a more reliable recognition result to perform the subsequent operations, thereby improving the accuracy of a positioning result obtained finally.

In addition, the icons in the image may be recognized by using an image recognizing method well known in the art, and a recognition result is output. Similarly, the recognition result may comprise the detected icons and confidence thereof. Then, all the recognized icons or icons with confidence greater than the threshold in the recognized icons may be extracted.

For example, in the example shown in FIG. 3, at least the characters " "欢", "迎", ", "来", "到", "家", "乐", "福", "中", "关", "村", "广", "场", "店", "入", "口", "C", "a", "r", "r", "e", "f", "o", "u", "r", "家", "乐", "福" may be recognized (for the sake of brevity, not all characters which can be recognized are listed herein), and confidence thereof may be determined. Moreover, at least an icon "  " may also be recognized (for the sake of brevity, not all icons which can be recognized are listed herein), and confidence thereof may be determined. In the example shown in FIG. 4, at least the characters "W", "a", "t", "s", "o", "n", "s", "屈", "臣", "氏", "更", "加", "关", "心", "你" may be recognized (for the sake of brevity, not all characters which can be recognized are listed herein), and confidence thereof may be determined.

Returning to FIG. 2, in step S202, the extracted characters or icons may be analyzed to determine a meaning of the characters or the icons.

Specifically, the extracted characters may be organized into a character string in a row or column order. For example, the respective extracted characters may be arranged into one or more rows according to positions thereof which are included in the recognition result, and then may be organized into a character string in the row order, or the extracted characters may be arranged into one or more columns according to the positions thereof, and then may be organized into a character string in the column order. In this embodiment, it may be determined whether the extracted characters should be arranged into a row(s) or a column(s) according to a writing habit of a country and/or a region where the user is located. If the writing habit of the country and/or the region where the user is located is row-by-row writing, the extracted characters may be arranged into a row(s); otherwise, if the writing habit of the country and/or the region where the user is located is column-by-column writing, the extracted characters may be arranged into a column(s). Because the writing habit in China is the row-by-row writing, in the example shown in FIG. 3, the organized character string may be "欢迎来到家乐福中关村广场店入口 carrefour 家乐福", and in the example shown in FIG. 4, the organized character string may be "Watsons 屈臣氏更加关心你".

Then, the character string may be analyzed to determine one or more words with a specific meaning. Specifically, the character string may be analyzed by using a method well known in the art, and be subjected to word segmentation, so as to segment the character string into the one or more words with the specific meaning. The meaning of the one or more words may serve as a meaning of the extracted characters. The method for analyzing the character string and performing the word segmentation on the character string is well known in the art, and a detailed discussion thereof will be omitted herein for the sake of brevity. In the example shown in FIG. 3, the character string may be segmented into, for example, words "欢迎", "来到", "家乐福", "中关村", "广场", "店", "入口", "Carrefour", "家乐福" through the above analysis and word segmentation operations. Alternatively, the character string may be preprocessed before being analyzed and being subjected to the word segmentation. The preprocessing may be, for example, spelling correction to correct a spelling error in the character string. For example, if "Carrefourr" appears in the character string, the spelling correction may be performed on the character string so that the "Carrefourr" is modified into a correct spelling "Carrefour".

It should be appreciated that, the above-mentioned method for determining whether the extracted characters are arranged into a row(s) or a column(s) is exemplary, and such a determination may be performed in other manners. For example, the extracted characters may be arranged into a row(s) and organized into a character string in the row order, and the character string is analyzed and subjected to the word segmentation so as to obtain a first segmentation result including words obtained by segmenting the character string. Then, the extracted characters may be arranged into a column(s), and organized into a character string in the column order, and the character string is analyzed and subjected to the word segmentation so that a second segmentation result including words obtained by segmenting the character string is obtained. Then, correction rates of the segmented words included in the first segmentation result and the second segmentation result (or success rates of the word segmentation for the first segmentation result and the second segmentation result) may be compared. In such a case, an arrangement manner (arrangement in row or column) corresponding to the segmentation result with a higher correction rate (or success rate) may be determined to be a correct arrangement manner, and the words included in this segmentation result are determined to be the words with the specific meaning.

On the other hand, the extracted icons may be matched with pre-stored icons with a specific meaning so as to determine a meaning of the extracted icons. For example, one or more icons with a specific meaning such as identifications of office buildings, stores, residential buildings, streets or the like (for example, the above icon "  " representing the Carrefour supermarket) may be pre-stored in a database. An image matching may be performed between the extracted icons and the pre-stored icons, so that icons matching with (i.e., identical or similar to) the extracted icons are found from the pre-stored icons, thereby determining the meaning of the found matching icons as the meaning of the extracted icons. In the example of FIG. 3, it can be determined that the extracted icon "  " represents the Carrefour supermarket through the above matching operation.

With further reference to FIG. 2, in step S203, the geographical location of the user may be determined based on the meaning of the extracted characters or icons.

In a first implementation mode, geographical locations which are searched for on a map and associated with the meaning of the characters or the icons may serve as candidate geographical locations. Here, the geographical locations associated with the meaning of the characters or the icons may be geographical locations of buildings, stores, streets, or the like indicated by the meaning of the characters or the icons. Specifically, the map (that is, map data indicating buildings, stores, streets and the like in respective geographical locations on the map) may be pre-stored in a database. For the extracted characters, because their meaning is represented by one or more words with a specific meaning which are obtained in step S202, the geographical locations associated with the meaning of the characters may be searched for on the map (in other words, in the database) by using a part or all of the one or more words as search keywords, to serve as the candidate geographical locations. For example, the search may be performed on the map or in the database by using an inverted list method. Alternatively, the geographical locations associated with the meaning of the characters may be searched for on the map (in other words, in the database) as the candidate geographical locations by using a word(s) representing a building, a store or a street in the one or more words as search keywords. For example, in the example of FIG. 3, "Carrefour" may be used as a search keyword, or Carrefour" and "Zhongguancun" may be used as search keywords. In a case where a plurality of words are used as search keywords, an intersection of search results (that is, geographical locations associated with meanings of the respective words respectively) obtained by search with the respective words as search keywords may be used as a final search result (that is, the candidate geographical locations). For example, in a case where "Carrefour" and "Zhongguancun" are used as search keywords, an intersection of a search result obtained by searching with "Carrefour" as a search keyword and a search result obtained by searching with "Zhongguancun" as a search keyword may be used as a final search result, that is, the candidate geographical locations. In addition, for the extracted icons, the geographical locations associated with the meaning of the icons may be searched for on the map (in other words, in the database) as the candidate geographical locations by using a word(s) with a meaning identical to that of the icons as a search keyword(s). For example, for the above icon " " representing the Carrefour supermarket, geographical locations where Carrefour supermarkets have been established may be searched for on the map as the candidate geographical locations by using the character "Carrefour" indicating the Carrefour supermarket as a search keyword.

If no geographical location associated with the meanings of the characters or the icons is founded by the search on the map, that is, the number of the candidate geographical locations is 0, the positioning fails. In contrast, if one or more geographical locations associated with the meanings of the characters or the icons are found by the search on the map, that is, there are one or more candidate geographical locations, the geographical location of the user may be determined based on the candidate geographical locations. Particularly, if there is only one candidate geographical location, the candidate geographical location may be used as the geographical location of the user. If there are a plurality of candidate geographical locations, the candidate geographical locations may be displayed to the user in the form of list, so that the user selects one candidate geographical location from the list as the geographical location of the user. For example, in a case where "Carrefour" and "Zhongguancun" are used as search keywords, although many geographical locations where the Carrefour supermarkets have been established and many geographical locations associated with Zhongguancun exist on the map, there is only one element in an intersection of the two kinds of geographical locations, that is, the Carrefour supermarket located in the Zhongguancun, so there is only one candidate geographical location, thereby the candidate geographical location may be used as the geographical location of the user. As another example, in a case where "Watsons" is used as a search keyword, because many Watsons stores have been established in China, there are a plurality of candidate geographical locations. In such case, the plurality of candidate geographical locations may be displayed to the user in the form of list, as shown below:

1. Watsons (Wensan Road store)
2. Watsons (Chendong store)
3. . . .

Then, the user may select one candidate geographical location from the list as his/her geographical location.

In a second implementation, geographical locations which are searched for in a predetermined geographical region on the map and are associated with the meanings of the characters or the icons may be used as candidate geographical locations. Then, the geographical location of the user may be determined based on the candidate geographical locations. Likewise, the geographical locations which are associated with the meanings of the characters or the icons as described herein may be geographical locations of building, stores, streets or the like indicated by the meanings of the characters or the icons. Compared with the first implementation, the second implementation narrows a search range by limiting the search range within the predetermined geographical region on the map, thereby reducing workload of the searching operation and improving a searching speed and a positioning speed. If the number of the candidate geographical locations is 0, the positioning fails. If there is only one candidate geographical location, the candidate geographical location may be used as the geographical location of the user. If there are a plurality of candidate geographical locations, the user selects one of the plurality of candidate geographical locations as the geographical location of the user in the above-mentioned mode. For example, it is assumed that the meaning of the characters is "Carrefour Supermarket" and the predetermined geographical region is Beijing, so all geographical locations where Carrefour supermarkets have been established may be searched for in the range of Beijing on the map as candidate geographical locations, and the candidate geographical locations are displayed to the user. In such an example, because a plurality of Carrefour supermarkets have been established in the range of Beijing, the geographical locations of these Carrefour supermarkets may be displayed to the user in the form of list as the candidate geographical locations, so that the user selects one candidate geographical location from the displayed candidate geographical locations as the geographical location of the user.

In this implementation, the predetermined geographical region may be determined according to historical positioning information of the user. Particularly, every time the user is successfully positioned, information related to the positioning operation, for example, time of the positioning operation, the determined geographical location (for example, geographical coordinates) of the user and the like, may be stored as the historical positioning information. When a current positioning operation is performed, a geographical region where the user is located may be determined according to the historical positioning information, as the predetermined geographical region. It should be noted that, as time passes, a precision of the geographical location of the user, which is indicated by the historical positioning information, gradually decreases due to movement of the user, so it is necessary to gradually roughly determine the geographical region where the user is located for the current positioning operation. For example, if it is known from the historical positioning information that one positioning operation was performed 2 minutes before the current time, and the geographical location of the user determined through the positioning operation is a certain shopping center in Zhongguancun, Haidian district, Beijing, then for the current positioning operation, the geographical region where the user is located may be determined as Zhongguancun, Haidian district, Beijing; if it is known from the historical positioning information that one positioning operation was performed 1 hour before the current time, and the geographical location of the user determined through the positioning operation is a certain shopping center in Zhongguancun, Haidian district, Beijing, then for the current positioning operation, the geographical region where the user is located may be determined as Beijing rather than Zhongguancun, Haidian district, Beijing, because the user may have left Zhongguancun within the one hour. Alternatively, the predetermined geographical region may be determined by using positioning information which indicates a geographical region where the user is located and is obtained for this positioning operation, and the positioning information may be obtained, for example, by a conventional GPS positioning method or a WIFI positioning method. For example, when the user is in a room, although an accurate geographical location of the user can not be determined due to a low GPS signal reception quality, it is sufficient to determine the geographical region where the user is located according to the GPS signal, then the geographical region may be used as the predetermined geographical region.

It is to be explained that the database for storing the map may be located in the portable device, in which case the portable device performs the search. The database may also be located in a server which may be accessed by the portable device, in which case the portable device may send the search keywords determined in the above manner, or the search keywords and the predetermined geographical region to the server, and the server performs the search and sends a search result (the candidate geographical locations) to the portable device so as to be displayed to the user.

In this way, with the above method, the geographical location of the user may be accurately determined in various scenarios, especially in a scenario where the geographical location may not be accurately determined by using a conventional positioning method, and the positioning precision may reach a store level, that is, a level of tens of meters and even a few meters. Accurate navigation information may be further generated by using such geographical location of the user, so as to improve user experience. In addition, if the user pushes his/her geographical location thus determined to a merchant, the merchant may provide more accurate LBS, for example, LBS-based advertisement pushing, so that a quality of service of the merchant is improved.

Next, a block diagram of a device (referred to as positioning device hereinafter) for determining a geographical location of a user according to an embodiment of the present disclosure will be described with reference to FIG. 5. The device may be a portable device carried by the user, and may perform the above method. Because details of respective operations performed by the device are substantially same as the method described above with respect to FIG. 2, the device is only described briefly below, and a description of same details are omitted in order to avoid repetition.

Figure 5:
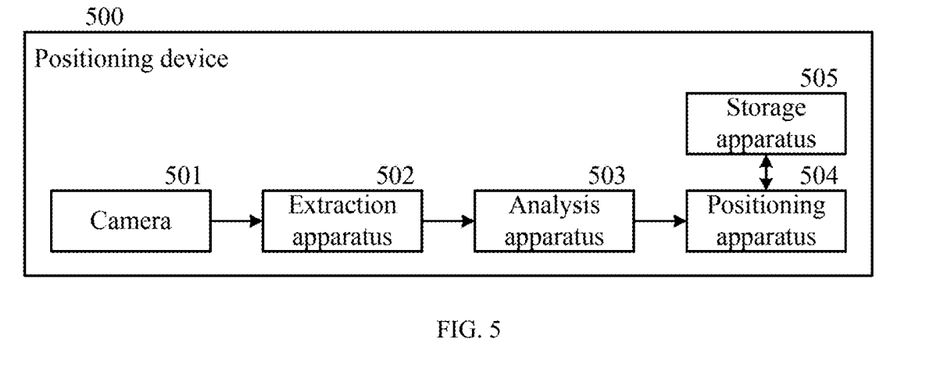
FIG. 5 shows a block diagram of a device for determining a geographical location of a user according to an embodiment of the disclosure.

As shown in FIG. 5, the device 500 for determining a geographical location of a user comprises a camera 501, an extraction apparatus 502, an analysis apparatus 503, a positioning apparatus 504 and a storage apparatus 505. The camera 501 may be implemented by the camera 112 shown in FIG. 1. The extraction apparatus 502, the analysis apparatus 503 and the positioning apparatus 504 may be implemented by the processor 102 shown in FIG. 1, and the storage apparatus 505 may be implemented by the storage apparatus 104 shown in FIG. 1.

The camera 501 may be used for taking an image at a place where the user is located. As described above, the image may be a photo or a video, and the photo may comprise one or more photos of a single scenario or may be a panoramic photo. The image taken may reflect an environment where the user is located, for example, a building (an office building or a residential building) near the user, a store near the user, a street where the user is located, or the like. Accordingly, the image may comprise a character(s) and/or an icon(s), and the character(s) or the icon(s) may be an identification of the building such as the office building or the residential building, the store or the street, or may be a character(s) or an icon(s) of other types, such as an advertisement, a road sign, promotion information and the like. Certainly, the image may also be taken by other shooting devices, and the image taken may be sent to the positioning device 500. In such a case, the camera 501 may be omitted.

The extraction apparatus 502 may extract the characters and/or the icons in the image taken. Specifically, the extraction apparatus may recognize characters or icons in the image, and extract all the recognized characters or icons, or characters or icons with confidence greater than a threshold in all the recognized characters or icons. The threshold may be a numerical value preset as required. Alternatively, before recognizing the characters or the icons in the image, the extraction apparatus 502 may preprocess the image so as to facilitate the recognition. For example, in a case where the image is a photo, the preprocessing may comprise zooming the photo, and in a case where the image is a video, the preprocessing may comprise extracting a key frame of the video.

In this embodiment, the extraction apparatus 502 may recognize the characters in the image by using an OCR method. Specifically, the extraction apparatus 502 may scan the image to detect positions of all character boxes possibly including the characters in the image, and then may recognize content in each character box as characters and output a recognition result. As described above, the recognition result may comprise the recognized characters and positions of the characters. The recognition result may further comprise confidence of the recognized characters. In addition, the extraction apparatus 502 may recognize the icons in the image by using an image recognizing method well known in the art, and output a recognition result. Similarly, the recognition result may comprise the detected icons and confidence thereof.

The analysis apparatus 503 may analyze the characters or the icons extracted by the extraction apparatus 502 to determine a meaning of the characters or the icons. Specifically, for the extracted characters, the analysis apparatus 503 may organize them into a character string in a row or column order. The analysis apparatus 503 may arrange the extracted characters into one or more rows according to positions thereof which are included in the recognition result and then organize the characters into the character string in the row order, or may arrange the extracted characters into one or more columns according to the positions thereof and then organize the characters into a character string in the column order. In this embodiment, the analysis apparatus 503 may determine whether the extracted characters should be arranged into a row(s) or a column(s) in the manner described above with respect to FIG. 2.

Then, the analysis apparatus 503 may analyze the character string to determine one or more words with a specific meaning. Specifically, the analysis apparatus 503 may analyze the character string by using a method well known in the art and perform word segmentation on the character string, so as to segment the character string into the one or more words with the specific meaning. The meaning of the one or more words may serve as the meaning of the extracted characters. The method for analyzing and performing word segmentation on the character string by the analysis apparatus 503 is well known in the art, so a detailed discussion thereof will be omitted herein for the sake of brevity. Alternatively, the analysis apparatus 503 may preprocess the character string before analyzing the character string and performing word segmentation on the character string. The preprocessing may be, for example, spelling correction to correct a spelling error in the character string.

In addition, for the extracted icons, the analysis apparatus 503 may match the icons with pre-stored icons with specific meanings so as to determine the meaning of the extracted icons, as described above.

The positioning apparatus 504 may determine the geographical location of the user based on the meaning of the extracted characters or icons.

In a first implementation, the positioning apparatus 504 may use geographical locations which are searched for on a map and associated with the meaning of the characters or the icons as candidate geographical locations. Here, the geographical locations associated with the meaning of the characters or the icons may be geographical locations of buildings, stores, streets, or the like indicated by the meaning of the characters or the icons. As described above, the map (that is, map data indicating buildings, stores, streets and the like in respective geographical locations on the map) may be pre-stored in a database. For the extracted characters, the positioning apparatus 504 may search for the geographical locations associated with the meaning of the characters on the map (in other words, in the database) by taking part or all of the one or more terms as search keywords, to serve as the candidate geographical locations. Alternatively, the analysis apparatus 504 may search the geographical locations associated with the meanings of the characters on the map (in other words, in the database) by using a part or all of the one or more words as search keywords, to serve as the candidate geographical locations. In a case where a plurality of terms are used as search keywords, the positioning apparatus 504 may use an intersection of search results (that is, geographical locations associated with meanings of the respective words respectively) obtained by search with the respective words as search keywords, as a final search result (that is, the candidate geographical locations). In addition, for the extracted icons, the positioning apparatus 504 may search for the geographical locations associated with the meaning of the icons on the map (in other words, in the database) as the candidate geographical locations by using a word(s) with a meaning identical to that of the icons as a search keyword(s).

If no geographical location associated with the meanings of the characters or the icons is founded by the search on the map, that is, the number of the candidate geographical locations is 0, the positioning fails. In contrast, if one or more geographical locations associated with the meanings of the characters or the icons are found by the search on the map, that is, there are one or more candidate geographical locations, the positioning apparatus 504 may determine the geographical location of the user based on the candidate geographical locations. Specifically, if there is only one candidate geographical location, the positioning apparatus 504 may use the candidate geographical location as the geographical location of the user. If there are a plurality of candidate geographical locations, the positioning apparatus 504 may display the candidate geographical locations to the user in the form of list and use one candidate geographical location selected by the user from the list as the geographical location of the user.

In a second implementation, the positioning apparatus 504 may use geographical locations which are searched for in a predetermined geographical region on the map and are associated with the meanings of the characters or the icons, as candidate geographical locations. Then, the positioning apparatus 504 may determine the geographical location of the user based on the candidate geographical locations. As described above, geographical locations which are searched for in a predetermined geographical region on the map and are associated with the meanings of the characters or the icons. Likely, if the number of the candidate geographical locations is 0, the positioning fails. If there is only one candidate geographical location, the positioning apparatus 504 may use the candidate geographical location as the geographical location of the user. If there are a plurality of candidate geographical locations, the positioning apparatus 504 may use one candidate geographical location selected by the user from the plurality of candidate geographical locations as the geographical location of the user in the above-mentioned manner. In this implementation, as described above, the positioning apparatus 504 may determine the predetermined geographical region according to historical positioning information of the user. Alternatively, as described above, the positioning apparatus 504 may determine the predetermined geographical region by using positioning information which indicates a geographical region where the user is located and is obtained for this positioning operation, and the positioning information may be obtained, for example, by a conventional GPS positioning method or a WIFI positioning method.

Likewise, in this embodiment, the database may be located in the device 500, in which case, the device 500 performs the search. The database may also be located in a server which may be accessed by the device 500 (for example, a map server), in which case, the device 500 may send the search keyword(s) determined in the above manner, or the search keyword(s) and the predetermined geographical region to the server, so that the server performs the search based on such information and returns a search result to the device 500 so as to be displayed to the user.

In this way, with the above device, the geographical location of the user may be accurately determined in various scenarios, especially in a scenario where the geographical location may not be accurately determined by using a conventional positioning method, and a positioning precision can reach the store level. Therefore, user experience may be improved, and/or a quality of service of a merchant is improved.

Besides the method and the device described above, an embodiment of the disclosure may be a computer program product configured to determine a geographical location of a user. The computer program product comprises a computer readable storage medium on which computer program instructions are stored. The computer program instruction may be executed by a processor to enable the processor to extract characters or icons in an image taken at a place where the user is located; an analysis apparatus, configured to analyze the extracted characters or icons to determine a meaning of the characters or the icons; and a positioning apparatus, configured to determine the geographical location of the user based on the meaning of the characters or the icons. In this embodiment, the image is taken by a portable device of the user, and the characters or the icons may be an identification of an office building, a store, a residential building or a street. In addition, when the geographical location of the user is determined based on the meaning of the characters or the icons, geographical locations which are searched for in a predetermined geographical region on a map and indicated by the meaning of the characters or the icons may be used as candidate geographical locations, then the geographical location of the user may be determined based on the candidate geographical locations.

Although the exemplary embodiments of the invention have been shown and described, it is to be understood by those skilled in the art that various changes in form and detail may be made to these exemplary embodiments without departing from a spirit and a scope of the invention as defined by the appended claims and their equivalents.

What is claimed is:

1. A method for determining a geographical location of a user, comprising:
    extracting characters or icons in an image taken at a place where the user is located, the image reflecting an environment where the user is located;
    analyzing the extracted characters or icons to determine a meaning of the characters or the icons, analyzing the extracted characters or icons to determine a meaning of the characters or the icons including:
        organizing the extracted characters into a character string in a row or column order,
        analyzing the character string to determine one or more words with a specific meaning by performing word segmentation on the character string, and
        matching the extracted icons with pre-stored icons with specific meanings to determine the meaning of the extracted icons; and
    determining the geographical location of the user based on the meaning of the characters or the icons, determining the geographical location of the user based on the meaning of the characters or the icons including:
        selecting geographical locations which are searched for in a predetermined geographical region on a map and are associated with the meaning of the one or more words or the icons as candidate geographical locations, and
        determining the geographical location of the user based on the candidate geographical locations.

2. The method according to claim 1, wherein the image is taken by a portable device of the user.

3. The method according to claim 1, wherein the characters or the icons are an identification of an office building, a store, a residential building or a street.

4. The method according to claim 1, wherein the extracting characters or icons in an image taken at a place where the user is located includes:
    recognizing characters or icons in the image, and
    extracting all the recognized characters or icons, or characters or icons with confidence greater than a threshold in all the recognized characters or icons.

5. The method according to claim 1, wherein the predetermined geographical region is determined according to historical positioning information of the user or positioning information indicating a geographical region where the user is located.

6. A device for determining a geographical location of a user, comprising:
    a processor;
    a memory; and
    computer program instructions stored in the memory, which, when executed by the processor, cause the processor to execute steps of:
        extracting characters or icons in an image taken at a place where the user is located, the image reflecting an environment where the user is located;
        analyzing the extracted characters or icons to determine a meaning of the characters or the icons, analyzing the extracted characters or icons to determine a meaning of the characters or the icons including:
            organizing the extracted characters into a character string in a row or column order,
            analyzing the character string to determine one or more words with a specific meaning by performing word segmentation on the character string, and
            matching the extracted icons with pre-stored icons with specific meanings to determine the meaning of the extracted icons; and
        determining the geographical location of the user based on the meaning of the characters or the icons, determining the geographical location of the user based on the meaning of the characters or the icons including:
            selecting geographical locations which are searched for in a predetermined geographical region on a map and are associated with the meaning of the one or more words or the icons as candidate geographical locations, and
            determining the geographical location of the user based on the candidate geographical locations.

7. The device according to claim 6, further comprising:
    a camera, configured to taking the image.

8. The device according to claim 6, wherein the characters or the icons are an identification of an office building, a store, a residential building or a street.

9. The device according to claim 6, wherein the extracting characters or icons in an image taken at a place where the user is located includes:
    recognizing characters or icons in the image, and
    extracting all the recognized characters or icons, or characters or icons with confidence greater than a threshold in all the recognized characters or icons.

10. The device according to claim 6, wherein the predetermined geographical region is determined according to historical positioning information of the user or positioning information indicating a geographical region where the user is located.

11. A computer program product for determining a geographical location of a user, comprising:
    a non-transitory computer readable storage medium on which computer program instructions are stored, the computer program instruction being executed by a processor to cause the processor to:
        extract characters or icons in an image taken at a place where the user is located, the image reflecting an environment where the user is located;
        analyze the extracted characters or icons to determine a meaning of the characters or the icons, wherein analyze the extracted characters or icons to determine a meaning of the characters or the icons includes:
 organizing the extracted characters into a character string in a row or column order,
 analyzing the character string to determine one or more words with a specific meaning by performing word segmentation on the character string, and
 matching the extracted icons with pre-stored icons with specific meanings to determine the meaning of the extracted icons; and
determine the geographical location of the user based on the meaning of the characters or the icons, wherein determine the geographical location of the user based on the meaning of the characters or the icons includes:
 selecting geographical locations which are searched for in a predetermined geographical region on a map and are associated with the meaning of the one or more words or the icons as candidate geographical locations, and
 determining the geographical location of the user based on the candidate geographical locations.

12. The computer program product according to claim 11, wherein the image is taken by a portable device of the user.

13. The computer program product according to claim 11, wherein the characters or the icons are an identification of an office building, a store, a residential building or a street.

* * * * *